(12) United States Patent
Li et al.

(10) Patent No.: US 11,494,396 B2
(45) Date of Patent: Nov. 8, 2022

(54) AUTOMATED INTELLIGENT CONTENT GENERATION

(71) Applicant: Microsoft Technology Licensing, LLC, Redmond, WA (US)

(72) Inventors: Ji Li, San Jose, CA (US); Amit Srivastava, San Jose, CA (US); Muin Barkatali Momin, Santa Clara, CA (US); Muqi Li, Mountain View, CA (US); Emily Lauren Tohir, San Francisco, CA (US); SivaPriya Kalyanaraman, Sunnyvale, CA (US); Derek Martin Johnson, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/152,193

(22) Filed: Jan. 19, 2021

(65) Prior Publication Data

US 2022/0229832 A1    Jul. 21, 2022

(51) Int. Cl.
| | |
|---|---|
| *G06F 16/248* | (2019.01) |
| *G06F 16/242* | (2019.01) |
| *G06F 16/93* | (2019.01) |
| *G06F 16/2457* | (2019.01) |
| *G06N 3/02* | (2006.01) |

(52) U.S. Cl.
CPC ......... *G06F 16/248* (2019.01); *G06F 16/243* (2019.01); *G06F 16/24578* (2019.01); *G06F 16/93* (2019.01); *G06N 3/02* (2013.01)

(58) Field of Classification Search
CPC ....... G06F 16/248; G06F 16/243; G06F 16/93
USPC .......................................................... 707/609
See application file for complete search history.

(56) References Cited

U.S. PATENT DOCUMENTS

| 10,733,372 B2 | 8/2020 | Kumar et al. | |
| 2014/0379615 A1* | 12/2014 | Brigham | G06N 3/126 706/11 |
| 2014/0380268 A1* | 12/2014 | Gabel | G06F 8/00 717/104 |
| 2014/0380285 A1* | 12/2014 | Gabel | G06N 5/022 717/139 |

(Continued)

OTHER PUBLICATIONS

"International Search Report and Written Opinion Issued in PCT Application No. PCT/US21/062720", dated Mar. 28, 2022, 9 Pages.

*Primary Examiner* — Dung K Chau

(57) ABSTRACT

Automatic generation of intelligent content is created using a system of computers including a user device and a cloud-based component that processes the user information. The system performs a process that includes receiving a user query for creating content in a content generation application and determining an action from an intent of the user query. A prompt is generated based on the action and provided to a natural language generation model. In response to the prompt, output is received from the natural language generation model. Response content is generated based on the output in a format compatible with the content generation application. At least some of the response content is displayed to the user. The user can choose to keep, edit, or discard the response content. The user can iterate with additional queries until the content document reflects the user's desired content.

20 Claims, 10 Drawing Sheets

(56) References Cited

U.S. PATENT DOCUMENTS

| | | | |
|---|---|---|---|
| 2014/0380286 A1* | 12/2014 | Gabel | G06N 5/022 717/139 |
| 2015/0100943 A1* | 4/2015 | Gabel | G06F 8/30 717/106 |
| 2020/0371647 A1 | 11/2020 | Gerges et al. | |

* cited by examiner

FIG. 9

AUTOMATED INTELLIGENT CONTENT GENERATION

BACKGROUND

Traditionally, users create content using content development tools such as presentation creation applications, word processing applications, and so forth. The content and design of the material is created by the user. Some tools offer suggestions for design and layout, however the text content is created by the user and the suggestions rely on user text inputs.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for automatically generating intelligent content. The method includes receiving a user query and determining an action from an intent of the user query. The method includes generating a prompt based on the action and providing the prompt to a natural language generation model. In response to the prompt, output is received from the natural language generation model. The method includes generating response content based on the output in a format compatible with the content generation application. The method further includes displaying at least some of the response content. Other embodiments of this aspect include corresponding computer systems, apparatus, and computer programs recorded on one or more computer storage devices, each configured to perform the actions of the methods.

Implementations may include one or more of the following features. The method may include updating a content document compatible with the content generation application with at least a portion of the responsive content. The method may include receiving a first user query via the content generation application, detecting bias potential based on the first user query, generating hints to avoid the bias potential based on the first user query, and displaying, via the content generation application, the hints. In some embodiments, the user query is a first user query, and the method may include receiving a second user query via the content generation application, determining a second action from the second user query, and updating the content document based on the second action. In some embodiments, the method may include determining the intent of the user query based on the user query and at least one of a user preference history, global information, edit history of the content document, or a combination thereof. In some embodiments, generating the prompt is further based on user preference history, current content in the content document, global information, edit history of the content document, or a combination thereof. In some embodiments, generating the prompt further may include: querying a prompt library using the action and the user query to generate a list of potential prompts, ranking the potential prompts in the list of potential prompts, and selecting a highest ranked potential prompt to use as the prompt. In some embodiments, the response content may include a plurality of options for selection by a user, and the method may include receiving a selection of an option of the plurality of options and updating the content document with the option. In some embodiments, the method may include detecting bias potential based on the response content, generating hints to avoid the bias potential based on the response content, and displaying, via the content generation application, the hints. In some embodiments, the response content may include a plurality of options for selection by a user, and the method may include receiving an indication that each of the plurality of options is rejected by the user, generating hints based on the user query to help the user design a new user query, and displaying, via the content generation application, the hints. Implementations of the described techniques may include hardware, a method or process, or computer software on a computer-accessible medium.

BRIEF DESCRIPTION OF THE DRAWINGS

Many aspects of the disclosure can be better understood with reference to the following drawings. The components in the drawings are not necessarily drawn to scale. Some components or operations may not be separated into different blocks or may be combined into a single block for the purposes of discussion of some embodiments. Moreover, in the drawings, like reference numerals designate corresponding parts throughout the several views. While several embodiments are described in connection with these drawings, the disclosure is not limited to the embodiments disclosed herein. The technology is amendable to various modifications and alternative forms. The disclosure and figures herein are intended to provide a description of certain embodiments, and the intent is to cover all alternatives, modifications, and equivalents.

FIG. 9 illustrates another exemplary graphical user interface for a system of automated intelligent content generation, according to some embodiments.

DETAILED DESCRIPTION

Content design applications offer users a way to generate and edit content. Word processing applications (e.g., MICROSOFT WORD®), presentation creation applications (e.g., MICROSOFT POWERPOINT®), and other content development applications are available to users, and some offer various components, including neural networks or advanced intelligence tools, to suggest design and layout options for users. Detailed user text input is needed in these applications to generate the content. However, many users would benefit from assistance to generate content timely and completely.

The present disclosure provides a way to reduce the dependency on user text inputs and provide a way to generate entire texts based on a few inputs from users. The disclosed system may be implemented with any content development application. The solution includes a complete, natural language generation modelling powered solution to allow users to generate content with minimal text inputs in an iterative fashion. The user may be given the opportunity to provide a short problem statement or question. The system may use the user input to generate a prompt, provide the prompt to a natural language generation model, obtain the output from the natural language generation model, and suggest complete content to the user for use in the content document based on the output. This process may be iterative. The user may make edits or request additional content, clarification, design assistance, and so forth as many times as desired such that the originally created content is updated and modified based on the minimal additional input by the users until the user selects and finalizes the suggested results. In this way, the user may save substantial time to generate complete and accurate content documents.

Figure 1:
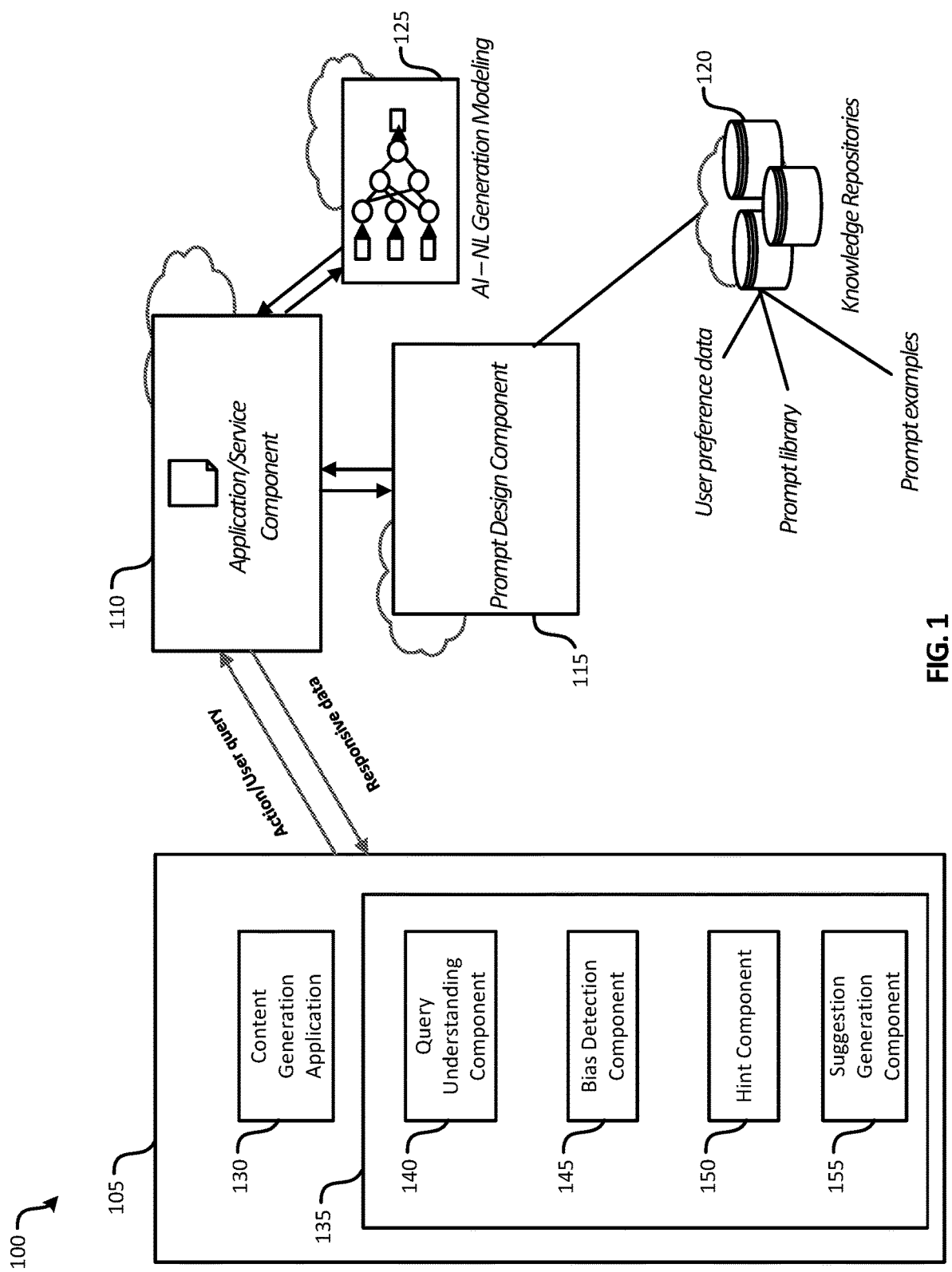
FIG. 1 illustrates an overview of a system for automated intelligent content generation, according to some embodiments.

Turning to FIG. 1, an exemplary system 100 for automated intelligent content generation is depicted. The system 100 includes user system 105, application/service component 110, prompt design component 115, knowledge repositories 120, and natural language generation modelling component 125.

User system 105 may include content generation application 130, and user system design components 135. The user system design components 135 may include query understanding component 140, bias detection component 145, hint component 150, and suggestion generation component 155. System 100 may include any number of user systems 105, and user system 105 may be any computing system including a laptop, desktop, server, or tablet such as, for example, computing system 1000 as depicted with respect to FIG. 10.

User system 105 may include memory for storing instructions that are executed by a processor. The memory may include content generation application 130 and user system design components 135. The content generation application 130 may be any content creation application including, for example, a word processing application (e.g., MICROSOFT WORD®), a presentation creation application (e.g., MICROSOFT POWERPOINT®), or any other content creation application (e.g., MICROSOFT EXCEL®, MICROSOFT ONENOTE®, MICROSOFT OUTLOOK®, MICROSOFT PUBLISHER®, MICROSOFT PROJECT®, or the like). The user system design components 135 may be included on the user system 105 as shown. In some embodiments, the user system design components 135 may be cloud based and access using a user interface on user system 105. In some embodiments, the user system design components 135 may be duplicated on user system 105 for local use and in a cloud environment for use by the cloud components.

The query understanding component 140 is used to process the user query and make determinations about the user's request. The query understanding component 140 takes the text query input by the user (i.e., the user query) and tries to understand the user's intention. The query understanding component 140 classifies the user's intention into one of two types of actions. The first is a natural language action that will use the natural language generation model. The second is any non-natural language action, such as a design request or modification, that will not use the natural language generation model. If the user requests content, for example, the system 100 can be used to automatically generate intelligent content. If the user requests design help, for example, design suggestion components may be used to provide suggestions. In some embodiments, the user request may be unintelligible, request toxic information (e.g., biased, inappropriate, or the like), or otherwise have an intent that is invalid. The query understanding component 140 makes decisions about processing the query as described in more detail with respect to FIG. 2.

The bias detection component 145 may be called to assess the user query to determine whether the query is likely to generate biased, toxic, or irrelevant content. The bias detection component 145 may also be used to assess the output from the natural language generation model to determine if the content is biased, toxic, or irrelevant. Biased, toxic, or irrelevant output may be generated at least in part due to the training of the natural language generation model. For example, the Generative Pre-trained Transformer 3 ("GPT-3") may be the natural language generation model used in system 100. It is an autoregressive language model that uses deep learning. GPT-3 is a powerful natural language generation model that produces human-like text. However, its training was completed using unfiltered, uncleaned, and potentially biased content. Accordingly, the output may be biased, toxic, or otherwise irrelevant. Such output may be filtered using the bias detection component 145. Further, certain input is more likely to generate such unwanted output. The bias detection component 145 may identify the input as likely to produce unwanted output and filter the input to avoid the result. As an example, the input text may be "presentation on Donald Trump." While this input may not be flagged by the bias detection component 145, the output may include, for example, "Donald Trump is the worst U.S. President in history" (i.e., biased), "Donald Trump is the best television personality and businessman" (i.e., biased), or "Donald Trump is a businessman and the $45^{th}$ U.S. President" (i.e., neutral/factual). Further, results may include inappropriate language (e.g., toxic) or otherwise irrelevant content. The bias detection component 145 may filter and/or flag such unwanted results. Further, the bias detection component 145 may be an artificial intelligence ("AI") component such as a machine learning algorithm that learns over time which types of inputs result in unwanted output. As such, the input may be flagged or a bias potential assigned. When the bias detection component 145 identifies a probability that the input may provide unwanted results or the output is toxic, biased, or otherwise irrelevant (i.e., a bias potential exists or exceeds a threshold), the hint component 150 may be used to provide hints for obtaining more relevant or wanted results. The bias detection component 145 may include a blocklists that detects toxic text that may not be processed. In such cases, the bias detection component 145 may assign a bias potential that exceeds the threshold. In some embodiments, the bias detection component 145 may learn over time and add new terms to the blocklist when results from the natural language generation model are toxic or when a user provides feedback that results are toxic or bad or that the input resulted in bad or toxic output. In some embodiments, these results and feedback can be used to expand the blocklist.

The hint component 150 may be an AI component that generates hints to avoid unwanted output. For example, the hint component 150 may receive the prompt "presentation on Donald Trump" and determine that a more specific request is less likely to generate an unwanted result. For example, the hint component 150 may generate hints such as "presentation on Donald Trump businesses," "presentation on Donald Trump's presidential achievements," or the like. The hint component 150 may output such results so that they are displayed to the user. In some embodiments, the user system design components 135 are accessed via a user system design component interface (not shown), and in some embodiments the user system design components 135 are accessed via the user interface of the content generation application 130.

Once the user system design components 135 have processed the user query and determined what action the user is requesting, the action or user query is sent to the application/service component 110, which may be cloud based. The application/service component 110 may send the user query or action to the prompt design component 115. The prompt design component 115 is used to generate a prompt that is appropriate for input to the natural language generation model 125. The prompt design component 115 may be an AI component that uses a machine learning algorithm or neural network to develop better prompts over time. The prompt design component 115 may access the knowledge repositories 120 including user preference data, a prompt library, and prompt examples to generate the prompt and return it to the application/service component 110. The application/service component 110 may provide the prompt to the natural language generation model 125 and obtain the response content. The response content may be sent back to the user system 105 and processed by the suggestion generation component 155. The suggestion generation component 155 may generate one or more suggestions for display of the content in a user interface or in in the content generation application. The suggestion generation component 155 may be part of the content generation application 130 in some embodiments and may utilize design suggestion tools to generate suggestions for display of the response content. Examples of suggestions are provided in user interfaces such as those described with respect to FIGS. 4-9. The selected suggestions may then be incorporated into a content document and displayed by the content generation application 130.

Figure 2:
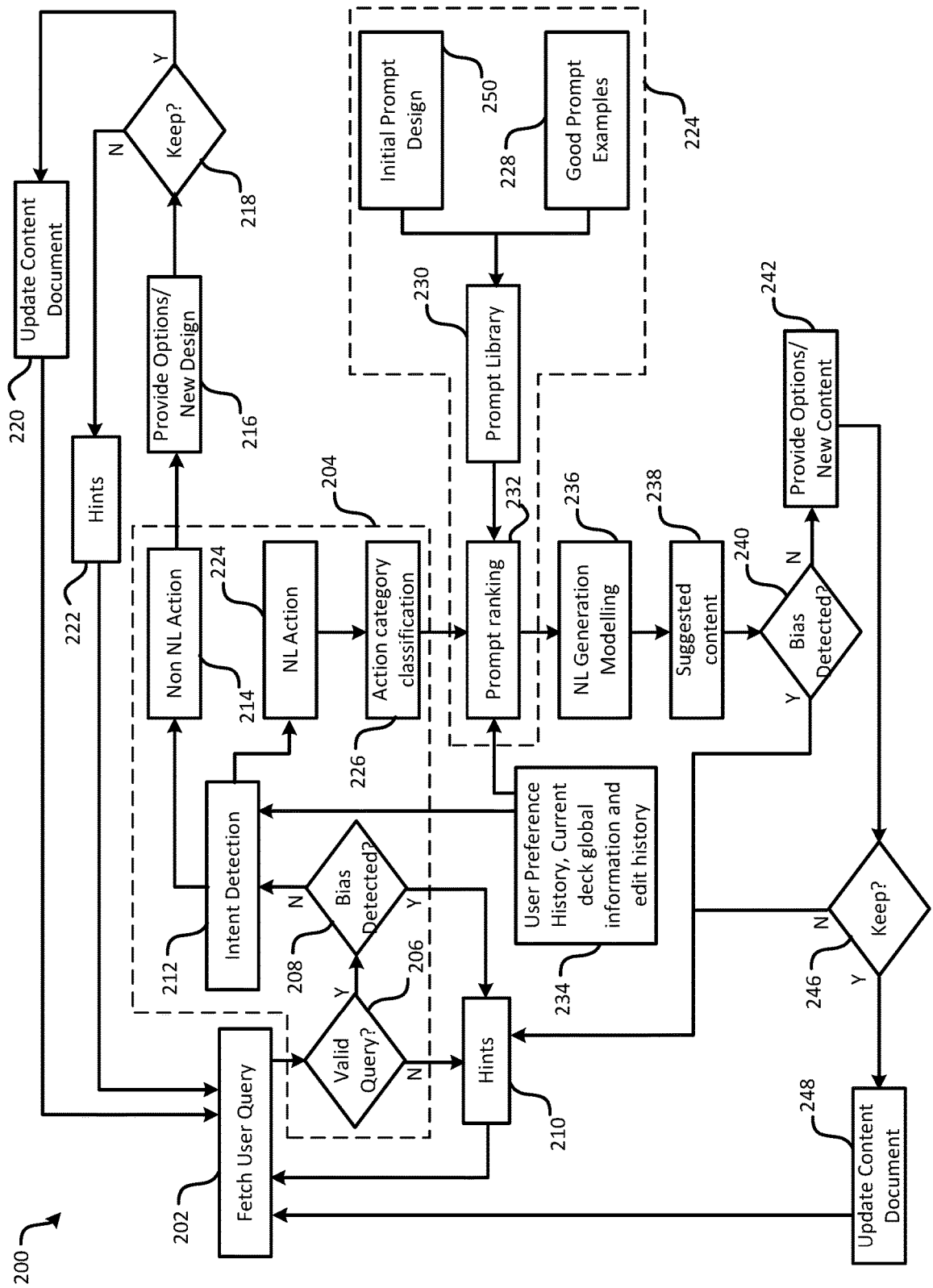
FIG. 2 illustrates a flowchart of behavior of the automated intelligent content generation system, according to some embodiments.

FIG. 2 illustrates a flowchart 200 of actions performed by system 100. The steps include actions performed by user system design components 135, content generation application 130, application/service component 110, prompt design component 115, and natural language modelling component 125. Many of the components used to perform the actions in flowchart 200 include artificial intelligence such as neural networks, machine learning, AI modelling, and the like.

The user query is fetched at step 202. The user query may be fetched using a user interface specific to the user system design components 135 or by a user interface of the content generation application 130. The query understanding component 140 may determine if the query is valid at step 206. For example, if the query is unintelligible, the query may be deemed invalid. The hint component 150 may be used to provide hints to the user based on the input query. The hint component 150 may provide hints to the user when a component of the system determines that a user will not get the desired outcome. For example, when the user input is biased, toxic or unintelligible, the outputs from the natural language generation model may be toxic or biased, or other scenarios discussed herein, the hint component 150 may be triggered. The hints may be human crafted and/or specific to scenarios when possible. When no relevant hint can be identified, a general guide or guidance may be provided to the user. The hint component 150 may log information on the reasons for triggering of the hint component 150 and the issues with the data that caused the hint component 150 to be triggered. The logged information may be used to improve other components of the system, such as the prompt design component 115 and the query understanding component 140.

If the query is valid, the bias detection component 145 may be used to determine if the user query has a bias potential at step 208. In other words, the bias detection component 145 may determine if the user query is likely to result in biased, toxic, irrelevant, or otherwise unwanted output. The bias detection component 145 may provide a binary (biased/not-biased) output for deciding step 208. In some embodiments, the bias detection component 145 may assign a score to the text (e.g., user query or output from the model) and based on the score exceeding a threshold make the decision at 208. If the bias detection component 145 determines there is a bias potential that exceeds a threshold, for example, the hint component 150 may again be used at step 210 to provide suggestions or hints for better user queries. The bias detection component 145 may be important based on the learning method of the natural language generation model. As discussed above, GPT-3 learned from unfiltered text data that had little cleaning or debiasing. The bias, toxicity, and other issues in the source data are then carried into the model. Accordingly, the bias detection component 145 may help prevent offensive, biased, toxic, or otherwise unwanted output. If the bias potential is sufficiently low, the query understanding component 140 may perform intent detection at step 212.

Intent detection may include determining the intent of the user query. The intent detection step 212 may include using the user preference history, current deck global information, and/or current deck edit history from data 234 to determine the intent. The intent detection classifies the user query into one of two types of actions. The first actions are those that do not use the natural language modelling (e.g., design requests), and the second actions are those that will use the natural language modelling (e.g., content requests). Accordingly, the query understanding component 140 may determine whether the user is requesting non-natural language actions (e.g., design suggestions) or natural language actions (e.g., content suggestions). If the user is requesting non-natural language actions, the non-natural language action is identified at step 214. These actions can be directly taken to update the content document and/or provide suggestions. For example, a design or other tool from the content generation application 130 may be used to provide options or new designs or layout at step 216. As an example, the user query may be "make the background purple." This may result in the design tools offering several shades of purple background options. The user may select whether or which options to keep at decision block 218. If the user chooses to keep one or more options, the content document is updated at step 220, and the system returns to waiting for a new user query at step 202. If the user does not keep the options, the hint component 150 may be used at step 222 to provide hints to the user for obtaining desired suggestions.

Returning to the intent detection step 212, the natural language action may be determined at step 224 if the user is requesting, for example, content suggestions. At step 226, the action category classification is determined using an action category classification model. For example, the action category may be outline generation. The action category may help the prompt ranker to narrow down the search space. The action category classification may also be used by the prompt design component to generate the prompt. The action category classification and/or user query may be sent to the application/service component 110 and then passed to the prompt design component 115 to perform the steps in block 224.

In some embodiments, the user query may not generate a valid action or valid action category, which may be determined in the valid query decision block 206 or may be determined when the action and category are being determined. In such cases without a valid action or action category, the hint component 150 may be used to provide hints to the user, helping the user to learn how to write better queries to interact with the system 100. Further, the queries with no valid action or action category may be analyzed to improve the query understanding component 140 and action category classification model, for example by adding more action categories to cover more user intents.

The prompt design component 115 may be used to generate an appropriate and ideally the best prompt to the natural language generation model 125 such that the desired output is generated by the model. The prompt design component 115 may be a machine learning based component to provide a large coverage of high-quality prompts to ensure the natural language generation model 125 generates valid and quality responses. The prompt design component 115 may use initial prompt design 250 and good prompt examples 228 as input to a prompt library 230 to generate possible prompts. The initial prompt design 250 may be human crafted and tested to cold-start the prompt design component 115. After initial experiments, the feedback from users can be used to craft more prompts to increase the coverage. Many prompts may also be learned from the user keeping suggestions (e.g., continuous learning). The possible prompts may be ranked by a prompt ranker based at least in part on user preference history, current deck global information, and/or current deck edit history from data 234 to generate a ranked list of prompts. The highest ranked prompt, for example, may be selected. The prompt ranker may be taught to sort the prompts to get the most relevant prompts to submit to the natural language generation model 125.

The prompt may be passed to the natural language generation model 125 to perform the modelling at step 236. At step 238, the suggested content is output from the natural language generation model 125. The suggested/response content is analyzed by the bias detection component 145 at step 240. The bias detection component 145 may determine a bias potential based on the response content including biased content, toxic content, irrelevant content, or the like. If the bias potential exceeds a threshold, for example, the hint component 150 may be used to provide hints to the user at step 210. If the bias potential is below the threshold, the response content may be used to generate new content and/or provide options to the user at step 242. While not shown, design and layout tools may be used with the content generation portions of the system to create quality content that has great design and layouts as well. The user may choose to keep one or more of the options at step 246 such that the content document is updated at step 248. If the user chooses not to keep any of the options at step 246, the hint component 150 may generate hints for the user at step 210.

After the hints are provided at 210 or the content document is updated at step 248, a new user query is awaited at step 202.

As described with respect to FIG. 2, the components of the intelligent content generation system 100, and specifically the user system design components 135 may be used in conjunction with other components of the content generation application 130 to provide content suggestions from the natural language generation model 125 as well as to provide design and layout suggestions from other tools utilized by or incorporated into the content generation application 130. Some examples are provided in the exemplary user interfaces depicted in FIGS. 4-9.

Figure 3:
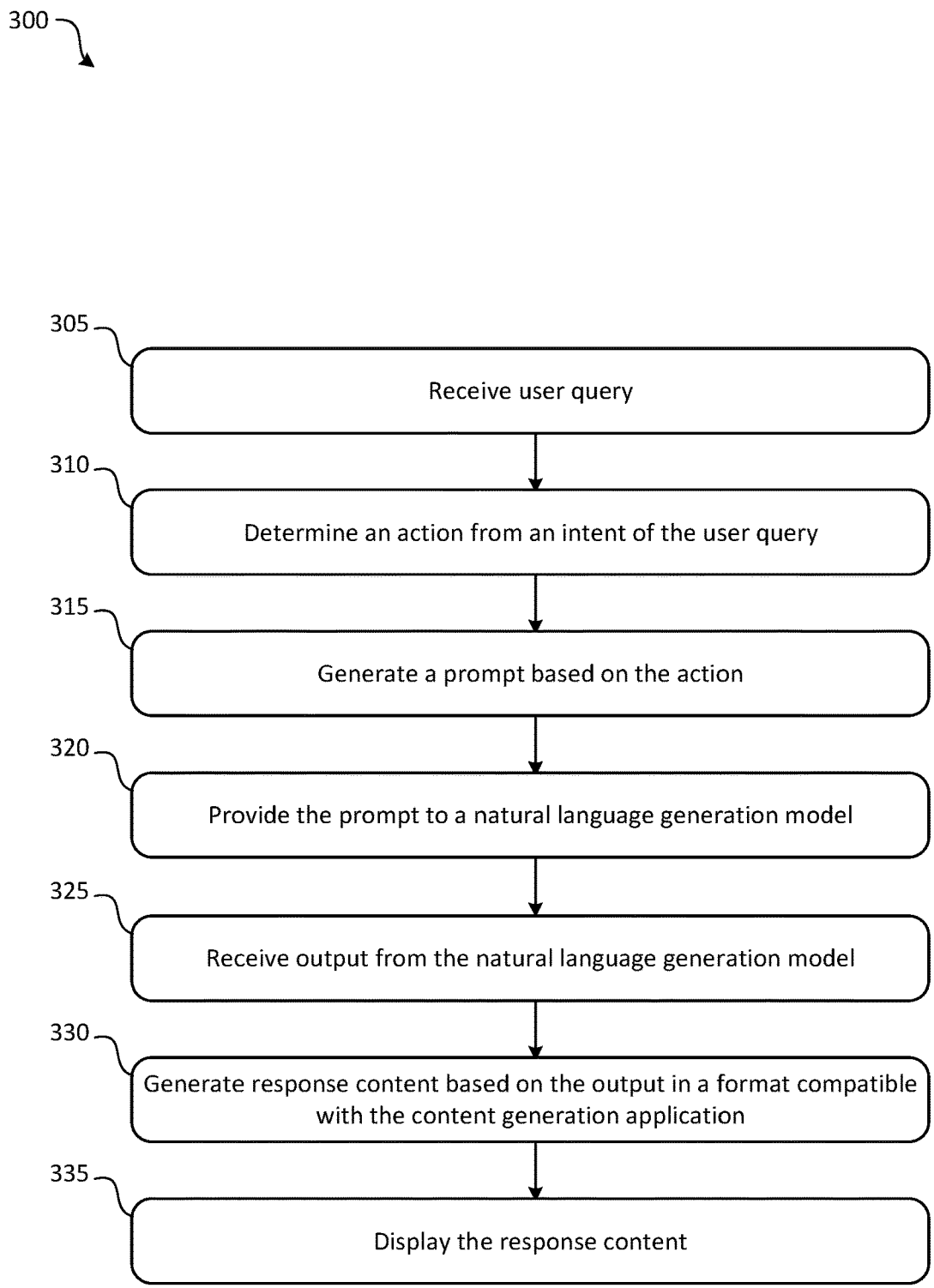
FIG. 3 illustrates a flowchart for automated intelligent content generation, according to some embodiments.

FIG. 3 illustrates a method 300 for automatically generating intelligent content using, for example, system 100. At step 305, a user query is received. For example, a user system design component user interface may be used to obtain the query from the user. In some embodiments, the content design application 130 user interface may be used to obtain the query from the user. The user query may be any request or query including, for example, a request for design suggestions, a request for content suggestions, a request for a combination of design and content suggestions, or any other request. A query understanding component (e.g., query understanding component 140) will filter out inappropriate user queries or otherwise route those user queries that are not for content or that will use a natural language action to the appropriate components. A user query that will use a natural language action is identified by the query understanding component, and at step 310 the natural language action is determined from an intent of the user query. The action category may be classified and the user query, action, and/or action category may be provided to a prompt design component (e.g., prompt design component 115). The prompt design component may generate a prompt at step 315 based on the determined action. At step 320, the prompt is provided to a natural language generation model (e.g., natural language generation model 125), such as GPT-3. The natural language generation model performs modelling, and at step 325 the output from the model is received. At step 330, the output is used to generate response content in a format compatible with the content generation application (e.g., word processing application, presentation creation application, or the like). The response content may be suggested content that are provided in one or more options to the user for selection by the user. The response content may be displayed at step 335. In some embodiments, the content document is updated with user selected response content and may be displayed via the content generation application 130.

Figure 4:
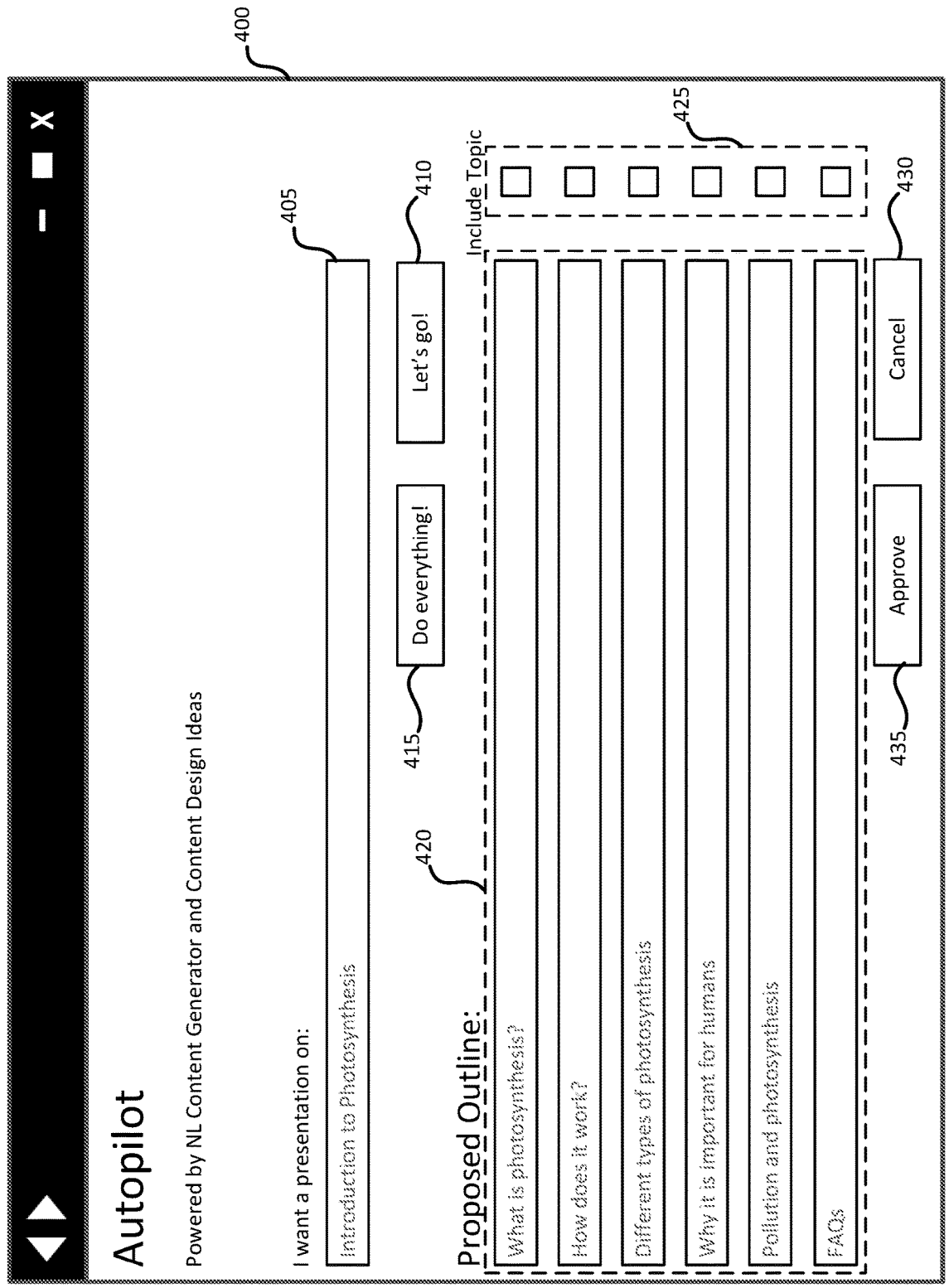
FIG. 4 illustrates an exemplary graphical user interface for a system of automated intelligent content generation, according to some embodiments.

FIG. 4 illustrates an exemplary user interface 400 used to interface with the automated intelligent content creation system (e.g., user system design components 135, application/service component 110). The user interface 400 may be provided to the user for generating content. FIGS. 4-9 depict an exemplary user interface for generating a presentation, but the topic, number of options, layout, design, and so forth are all provided as examples only and variations are understood to be within the scope of the present disclosure. The initial user interface 400 may include the query box 405, do everything button 415, and let's go button 410. This particular user interface 400 may be used with a presentation creation application such as MICROSOFT POWERPOINT® such that the user may request a presentation as depicted by the title to the query box 405. The user may enter "Introduction to Photosynthesis" as shown in query box 405, indicating the user would like a presentation that provides an introduction to photosynthesis. If the user selects the do everything button 415, the system may generate a presentation and provide it to the user. In the depicted example, the user has selected the let's go button 410, and a proposed outline is provided as shown in suggestion section 420.

The suggested proposed outline is initial response content generated and displayed in the provide options step 242 as described in FIG. 2. Initially, the Introduction to Photosynthesis user query is analyzed by the query understanding component as described with respect to FIGS. 1 and 2. The action is determined based on the intent, and a prompt is generated based on the user query and determined action by the prompt design component. For example, the user query may be determined to be valid, and the bias potential may be sufficiently low such that the query understanding component detects the intent (e.g., generate a presentation on photosynthesis), which results in a natural language action and classification. The prompt design tool then takes the action, user query, and/or classification to generate a prompt using prompt examples, the prompt library, user preference history, global information, edit history, or a combination thereof to create and rank prompts. A prompt is selected and provided to the natural language generation model. The output from the natural language generation model may be analyzed to generate the proposed outline.

The proposed outline includes six (6) topics as depicted in FIG. 4, although any number of proposed topics may be generated. Each topic may have a corresponding checkbox in section 425 that allows the user to include or exclude the corresponding topic. Additionally, the proposed outline may be provided in textboxes, allowing the user to modify the title of each topic. Once the user has selected the topics to include and/or modified the titles to the topics, the user may press the approve button 435. Alternatively, if the user is unhappy with the proposed topics or otherwise does not wish to continue, the user may select the cancel button 430 to abort the content generation.

Figure 5:
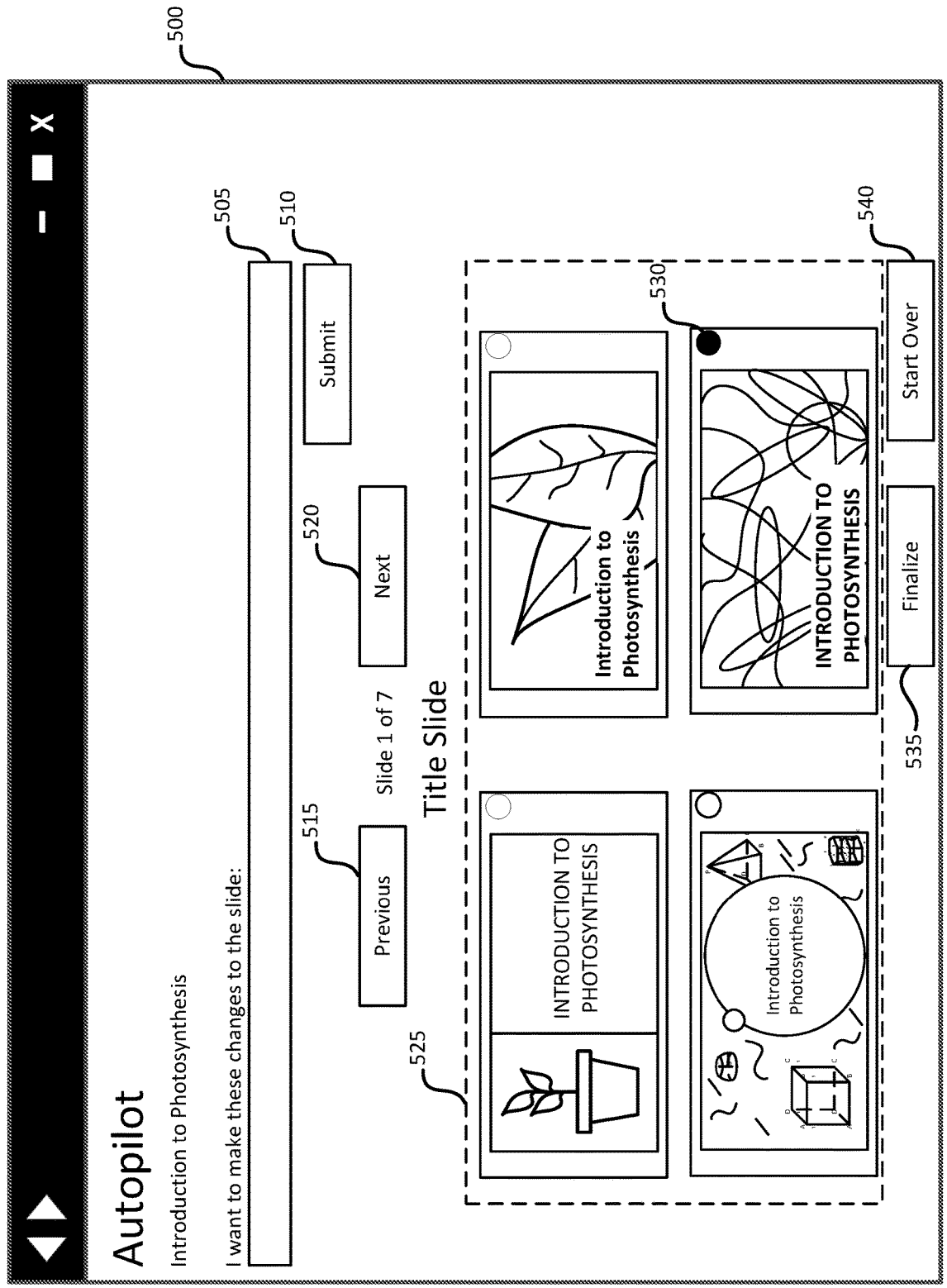
FIG. 5 illustrates another exemplary graphical user interface for a system of automated intelligent content generation, according to some embodiments.

In the provided example, the user has selected all six topics and clicked the approve button 435, which launches the graphical user interface 500 as described with respect to FIG. 5.

FIG. 5 illustrates exemplary graphical user interface 500 that is generated after the user selects proposed outline topics and the approve button 435 as shown with respect to FIG. 4. The user interface 500 includes a query box 505 and an associated submit button 510. In the suggested options section 525, several title slides are presented for selection by the user. The user may select using radio buttons in the upper corner of each selection such as radio button 530. If the user chooses to request modifications to the selected slide, the user may enter a request in the query box 505 and select submit button 510. The query box 505 provides a way for the user to iteratively update the content and/or designs of the suggested options until the user is sufficiently pleased with at least one option. The user may scroll through the suggested options for each topic using the previous button 515 and next button 520. As depicted in user interface 500, the user is viewing options in suggested options section 525 for the first of seven slides. The user may have selected all six topics from user interface 400, and the seventh slide may be a title slide as depicted in user interface 500. The user may select an option, such as the slide depicted in the lower right corner selected by radio button 530 and continue through the options by selecting the next button 520. The user may complete the presentation with the selections already chosen by clicking the finalize button 535. In some embodiments, the finalize button 535 may not be available until all slides have been viewed and/or an option selected for each topic. The user may start the entire process over by selecting the start over button 540. In the present example, the user has selected the slide associated with radio button 530 and continues by selecting the next button 520.

Figure 6:
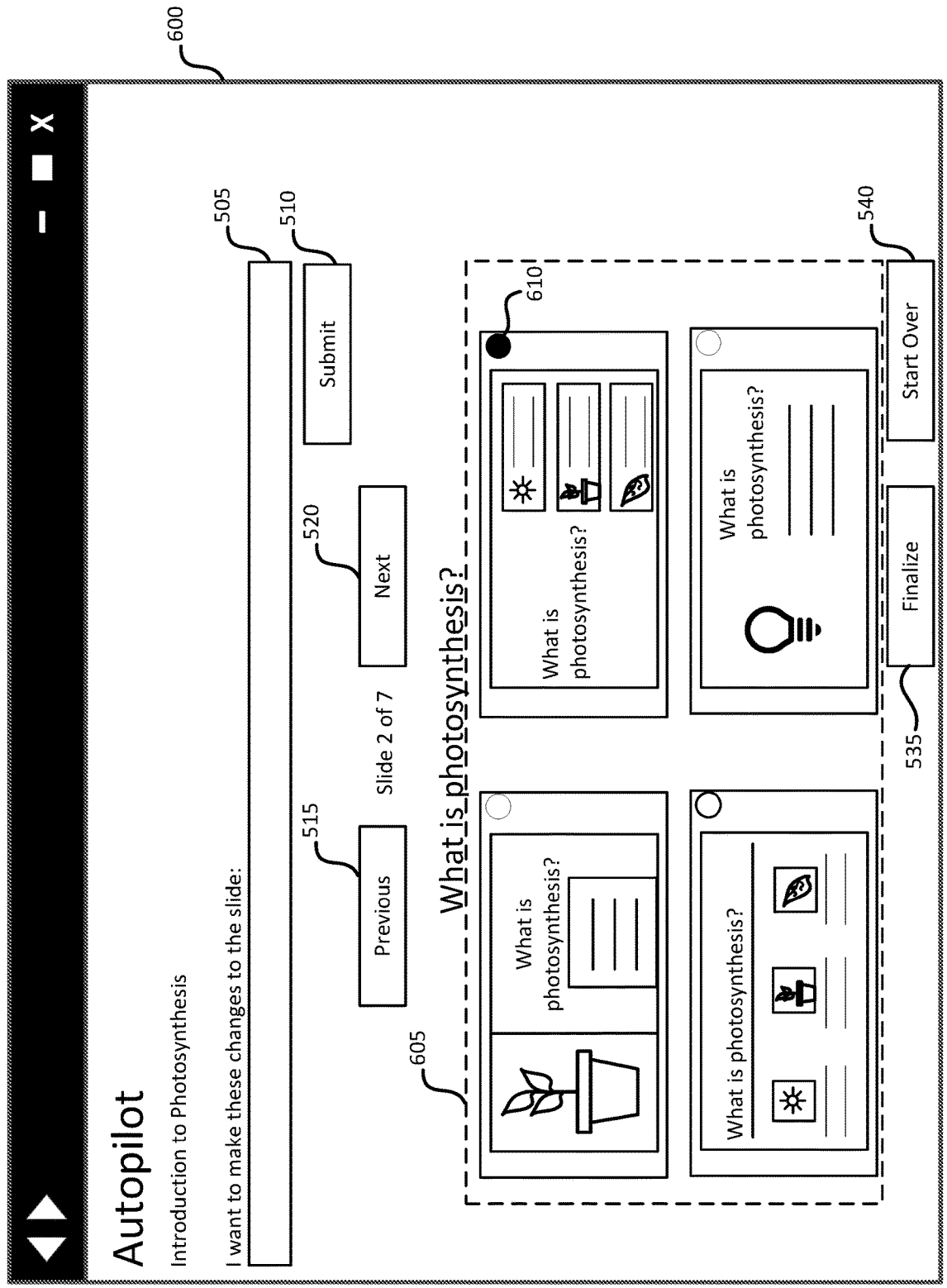
FIG. 6 illustrates another exemplary graphical user interface for a system of automated intelligent content generation, according to some embodiments.

FIG. 6 illustrates another exemplary graphical user interface 600, which may have similar selection options as the graphical user interface 500. The user interface 600 includes the query box 505, submit button 510, previous button 515, next button 520, finalize button 535, and start over button 540. The suggestion section 605 provides different selections than those in suggestion section 525 of user interface 500. As shown in FIG. 6, the options for the second of seven slides are available for selection in suggestion section 605. Further, the options suggested may correlate between slides. For example, the suggestion in the upper left corner of suggestion section 605 may have similar design, color, layout, and so forth as that of the suggestion in the upper left corner of suggestion section 525 as shown in FIG. 5. As the user navigates through each slide options, the consistent design and layout options may appear in the same order for the user's ease. In the present example, the user may select the slide suggestion associated with radio button 610 and select the next button 520 to proceed to view options for the third slide.

Figure 7:
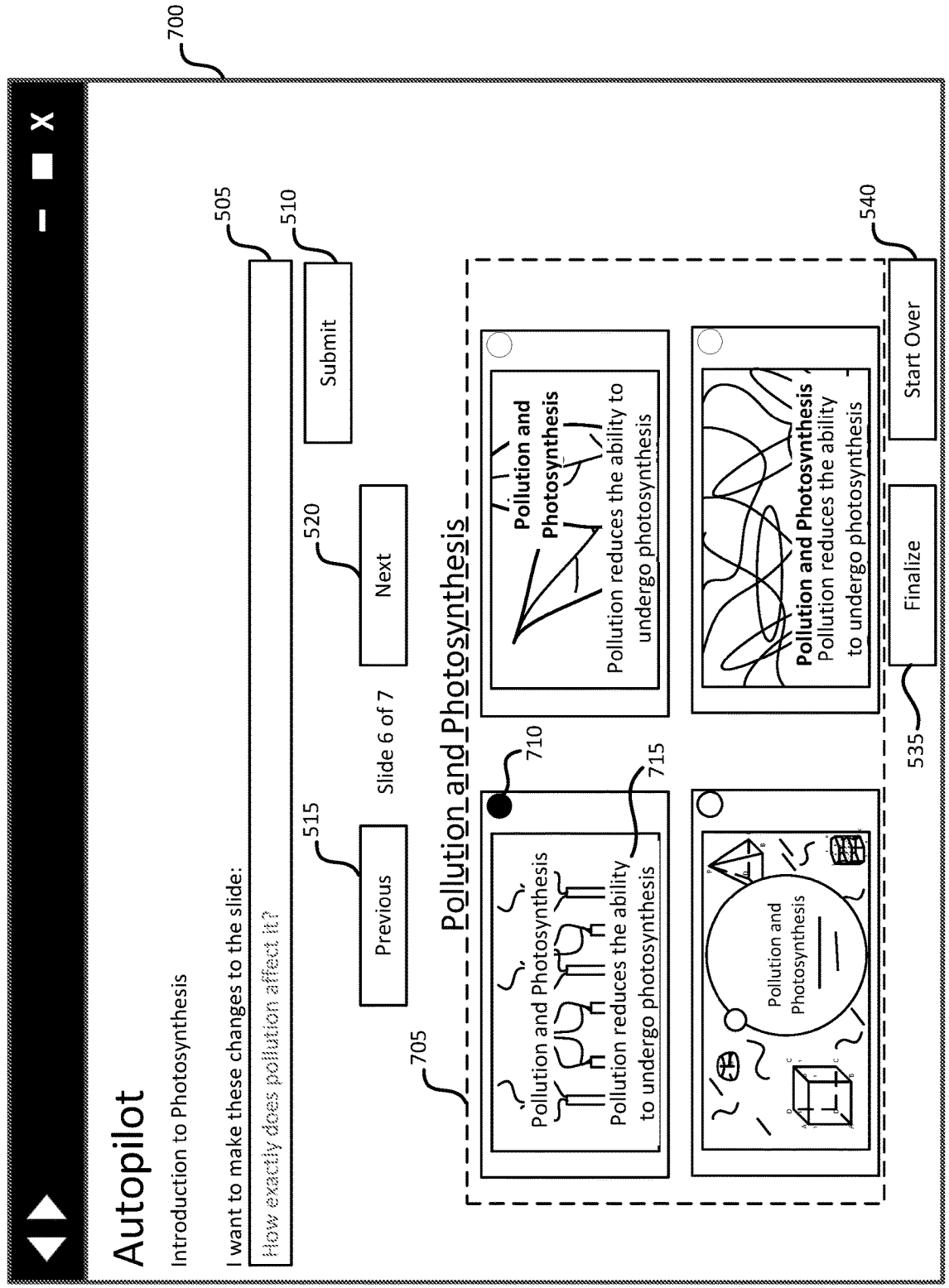
FIG. 7 illustrates another exemplary graphical user interface for a system of automated intelligent content generation, according to some embodiments.

FIG. 7 illustrates another exemplary graphical user interface 700 in which the user is now viewing options for the sixth of seven slides having a topic of pollution and photosynthesis. The user interface 700 may be similar to the user interfaces 500 and 600 having a query box 505, submit button 510, previous button 515, next button 520, finalize button 535, and start over button 540. The suggestion section 705 may include suggestions for options for the sixth slide. As depicted, the pollution and photosynthesis options include four slide options, each having a corresponding radio button. The text on the selected slide associated with the radio button 710 states, as shown by text 715, "pollution reduces the ability to undergo photosynthesis." In this example, the user may find this text 715 to be non-specific and may therefore use query box 505 to ask "how exactly does pollution affect it?" The user may then click the submit button 510 to submit the query in the query box 505. Using the context of the user history, current slide deck, and so forth, the query understanding component may process the query to generate a natural language action. The natural language action may be used along with the current slide deck and context of the user history to design a prompt and submit the prompt to the natural language generation model. The output may be used to generate response content, and the user interface 700 may be updated to display user interface 800 as depicted in FIG. 8.

Figure 8:
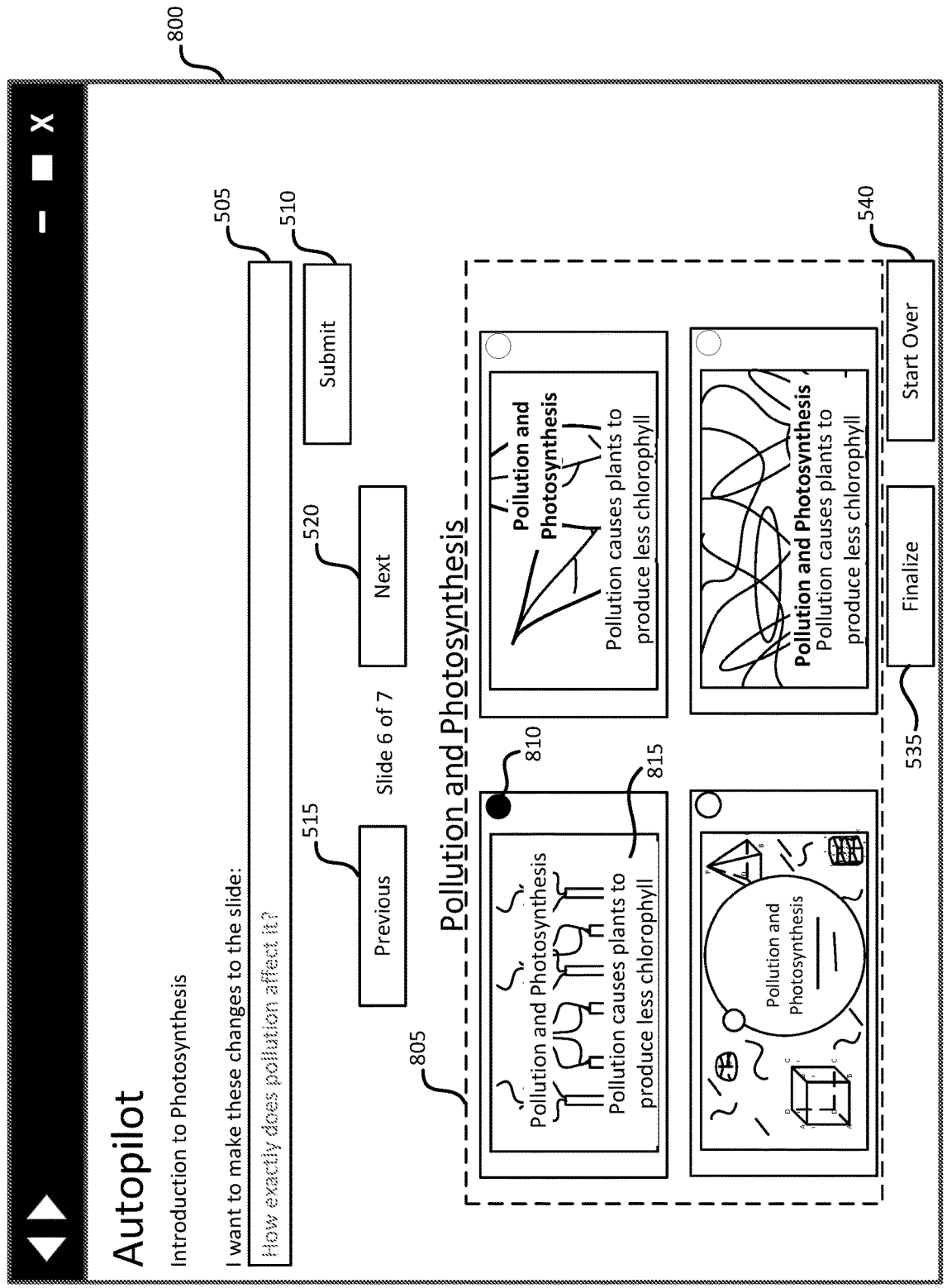
FIG. 8 illustrates another exemplary graphical user interface for a system of automated intelligent content generation, according to some embodiments.

FIG. 8 illustrates another exemplary graphical user interface 800 in which the user is viewing updated options for the sixth of seven slides after having results updated from the request entered in query box 505. In user interface 800, the text 715 has been updated to display text 815, "pollution causes plants to produce less chlorophyll." Each of the options in suggestion section 805 have been updated with the text 815, although in some embodiments, only the selected slide may be updated. The user may select the option associated with radio button 810 and select the next button 520 or previous button 515 to review other slide options for other topics in the presentation.

Figure 9:
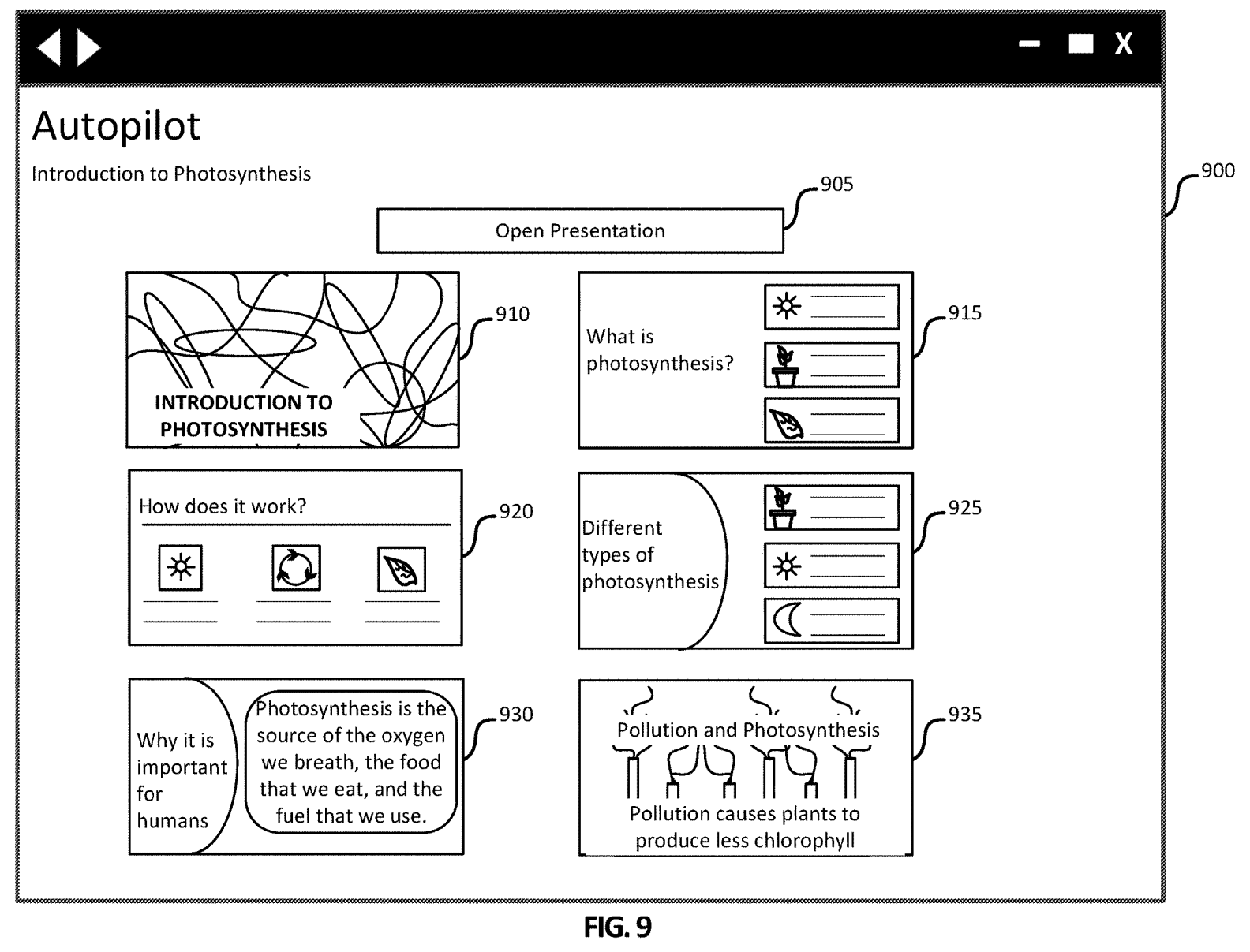

FIG. 9 illustrates another exemplary graphical user interface 900 generated after the user has selected the finalize button 535. All selected options for each slide are displayed to the user. The content document containing the selected options may be generated or updated with the selections. The user interface 900 includes an open button 905 as well as selected slides 910, 915, 920, 925, 930, and 935. The user interface 900 may include a scroll bar for scrolling down to see other selected slides. When the user selects the open button 905, the content document including the selected slides may be opened in a presentation creation application such as MICROSOFT POWERPOINT®.

Figure 10:
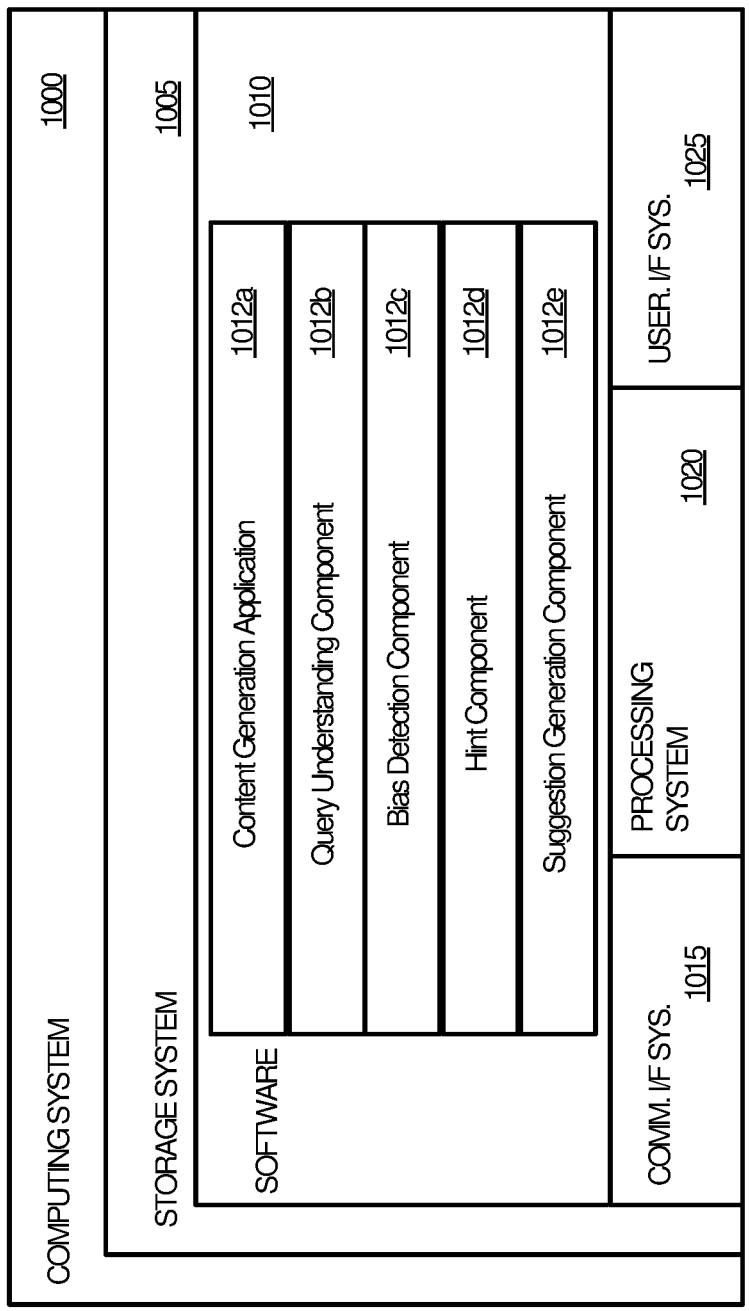
FIG. 10 illustrates an exemplary computer system.

FIG. 10 illustrates a computing system 1000 suitable for implementing processing operations described herein related to automatic intelligent content generation, with which aspects of the present disclosure may be practiced. As referenced above, computing system 1000 may be configured to implement processing operations of any component described herein including the user system design components (e.g., user system design components 135, application/service components 110, prompt design component 115 of FIG. 1). As such, computing system 1000 may be configured as a specific purpose computing device that executes specific processing operations to solve the technical problems described herein including those pertaining to generation of intelligent content for users based on limited text inputs of the user. Computing system 1000 may be implemented as a single apparatus, system, or device or may be implemented in a distributed manner as multiple apparatuses, systems, or devices. For example, computing system 1000 may comprise one or more computing devices that execute processing for applications and/or services over a distributed network to enable execution of processing operations described herein over one or more applications or services. Computing system 1000 may comprise a collection of devices executing processing for front-end applications/services, back-end applications/service or a combination thereof. Computing system 1000 comprises, but is not limited to, a processing system 1020, a storage system 1005, software 1010, communication interface system 1015, and user interface system 1025. Processing system 1020 is operatively coupled with storage system 1005, communication interface system 1015, and user interface system 1025. Non-limiting examples of computer system 1000 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 1020 loads and executes software 1010 from storage system 1005. Software 1010 includes one or more software components (e.g., 1012A, 1012B, 1012C, 1012D) that are configured to enable functionality described herein. In some examples, computing system 1000 may be connected to other computing devices (e.g., display device, audio devices, servers, mobile/remote devices, VR devices, AR devices, etc.) to further enable processing operations to be executed. When executed by processing system 1020, software 1010 directs processing system 1020 to operate as described herein for at least the various processes, operational scenarios, and sequences discussed in the foregoing implementations. Computing system 1000 may optionally include additional devices, features, or functionality not discussed for purposes of brevity. Computing system 1000 may further be utilized as user system 105 or any of the cloud computing systems in system 100 (FIG. 1), process 200 (FIG. 2), method 300 (FIG. 3) and/or the accompanying description of FIGS. 4-9.

Referring still to FIG. 10, processing system 1020 may comprise processor, a micro-processor and other circuitry that retrieves and executes software 1010 from storage system 1005. Processing system 1020 may be implemented within a single processing device but may also be distributed across multiple processing devices or sub-systems that cooperate in executing program instructions. Examples of processing system 1020 include general purpose central processing units, microprocessors, graphical processing units, application specific processors, sound cards, speakers and logic devices, gaming devices, VR devices, AR devices as well as any other type of processing devices, combinations, or variations thereof.

Storage system 1005 may comprise any computer readable storage media readable by processing system 1020 and capable of storing software 1010. Storage system 1005 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 1005 may also include computer readable communication media over which at least some of software 1010 may be communicated internally or externally. Storage system 1005 may be implemented as a single storage device but may also be implemented across multiple storage devices or sub-systems co-located or distributed relative to each other. Storage system 1005 may comprise additional elements, such as a controller, capable of communicating with processing system 1020 or possibly other systems.

Software 1010 may be implemented in program instructions and among other functions may, when executed by processing system 1020, direct processing system 1020 to operate as described with respect to the various operational scenarios, sequences, and processes illustrated herein. For example, software 1010 may include program instructions for executing one or more content generation applications 1012a as described herein. Software 1010 may also include program instructions for executing one or more query understanding components 1012b for identifying user query intent and generating an action for the query, one or more bias detection components 1012c for determining a bias potential of user queries or output, one or more hint components 1012d for generating hints for the user when a user query or output has a bias potential exceeding a threshold, and/or one or more suggestion generation components 1012e for processing the output into response options for providing to the user for selection, as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1010 may include additional processes, programs, or components, such as operating system software, virtual machine software, or other application software. Software 1010 may also comprise firmware or some other form of machine-readable processing instructions executable by processing system 1020.

In general, software 1010 may, when loaded into processing system 1020 and executed, transform a suitable apparatus, system, or device (of which computing system 1000 is representative) overall from a general-purpose computing system into a special-purpose computing system customized to execute specific processing components described herein as well as process data and respond to queries. Indeed, encoding software 1010 on storage system 1005 may transform the physical structure of storage system 1005. The specific transformation of the physical structure may depend on various factors in different implementations of this description. Examples of such factors may include, but are not limited to, the technology used to implement the storage media of storage system 1005 and whether the computer-storage media are characterized as primary or secondary storage, as well as other factors.

For example, if the computer readable storage media are implemented as semiconductor-based memory, software 1010 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1015 may include communication connections and devices that allow for communication with other computing systems (not shown) over communication networks (not shown). Communication interface system 1015 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1025 may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 1025. In some cases, the input and output devices may be combined in a single device, such as a display capable of displaying images and receiving touch gestures. The aforementioned user input and output devices are well known in the art and need not be discussed at length here.

User interface system 1025 may also include associated user interface software executable by processing system 1020 in support of the various user input and output devices discussed above. Separately or in conjunction with each other and other hardware and software elements, the user interface software and user interface devices may support a graphical user interface, a natural user interface, or any other type of user interface, for example, that enables front-end processing and including rendering of, for example, user interfaces 400-900. Exemplary applications/services may further be configured to interface with processing components of computing system 1000 that enable output of other types of signals (e.g., audio output, handwritten input) in conjunction with operation of exemplary applications/services (e.g., a collaborative communication application/service, electronic meeting application/service, etc.) described herein.

Communication between computing system 1000 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method for automatically generating intelligent content, the method comprising:
   receiving a user query for content suggestions to be entered in a content document for display and editing in a word processing or presentation creation application;
   determining a natural language action from an intent of the user query;
   generating a prompt based on the natural language action;
   providing the prompt to a natural language generation model;
   receiving, in response to the prompt, output from the natural language generation model;
   generating response content based on the output in a format compatible with the word processing or presentation creation application; and
   displaying the response content by the word processing or presentation creation application as one or more selectable content suggestions.

2. The computer-implemented method of claim 1, further comprising:
   updating the content document with the content suggestions selected by a user.

3. The computer-implemented method of claim 1, further comprising:
   receiving a first user query;
   detecting bias potential based on the first user query;
   generating hints to avoid the bias potential based on the first user query; and
   displaying the hints.

4. The computer-implemented method of claim 1, wherein the user query is a first user query, the method further comprising:
   receiving a second user query;
   determining a second action from the second user query; and
   updating the content document based on the second action.

5. The computer-implemented method of claim 1, further comprising:
   determining the intent of the user query based on the user query and at least one of a user preference history, global information, edit history of the content document, or a combination thereof.

6. The computer-implemented method of claim 1, wherein generating the prompt is further based on user preference history, current content in the content document, global information, edit history of the content document, or a combination thereof.

7. The computer-implemented method of claim 1, wherein generating the prompt further comprises:
   querying a prompt library using the action and the user query to generate a list of potential prompts;
   ranking the potential prompts in the list of potential prompts; and
   selecting a highest ranked potential prompt to use as the prompt.

8. The computer-implemented method of claim 1, wherein the response content comprises an outline for a presentation and slides for each item of the outline of the presentation as the one or more selectable content suggestions, the method further comprising:
   receiving a selection of one or more items of the outline and a slide for each of the one or more items of the outline; and
   updating the content document with the selections.

9. The computer-implemented method of claim 1, further comprising:
   detecting bias potential based on the response content;
   generating hints to avoid the bias potential based on the response content; and
   displaying the hints.

10. The computer-implemented method of claim 1, the method further comprising:
    receiving an indication that each of the one or more selectable content suggestions is rejected by a user;
    generating hints based on the user query to help the user design a new user query; and
    displaying the hints.

11. A system comprising:
    one or more processors; and
    a memory having stored thereon instruction that, upon execution by the one or more processors, cause the one or more processors to:
      receive a user query for content suggestions to be entered in a content document for display and editing in a word processing or presentation creation application;
      determine a natural language action from an intent of the user query;
      generate a prompt based on the natural language action;
      provide the prompt to a natural language generation model;
      receive, in response to providing the prompt, output from the natural language generation model;
      generate response content based on the output in a format compatible with the word processing or presentation creation application; and
      display the response content by the word processing or presentation creation application as one or more selectable content suggestions.

12. The system of claim 11, wherein the instructions comprise further instructions that, upon execution by the one or more processors, cause the one or more processors to:
    update the content document with the content suggestions selected by a user.

13. The system of claim 11, wherein the instructions comprise further instructions that, upon execution by the one or more processors, cause the one or more processors to:

receive a first user query;

detect bias potential based on the first user query;

generate hints to avoid the bias potential based on the first user query; and display the hints.

14. The system of claim 11, wherein the user query is a first user query, and wherein the instructions comprise further instructions that, upon execution by the one or more processors, cause the one or more processors to:

receive a second user query;

determine a second action from the second user query; and update the content document based on the second action.

15. The system of claim 11, wherein the user query is a first user query, and wherein the instructions comprise further instructions that, upon execution by the one or more processors, cause the one or more processors to:

determine the intent of the user query based on the user query and at least one of a user preference history, global information, edit history of the content document, or a combination thereof.

16. The system of claim 11, wherein the instructions to generate the prompt is further based on user preference history, current content in the content document, global information, edit history of the content document, or a combination thereof.

17. The system of claim 11, wherein the instructions to generate the prompt comprises further instructions that, upon execution by the one or more processors, cause the one or more processors to:

query a prompt library using the action and the user query to generate a list of potential prompts;

rank the potential prompts in the list of potential prompts; and select a highest ranked potential prompt to use as the prompt.

18. The system of claim 11, wherein the response content comprises an outline for a presentation and slides for each item of the outline of the presentation as the one or more selectable content suggestions, and wherein the instructions comprise further instructions that, upon execution by the one or more processors, cause the one or more processors to:

receive a selection of one or more items of the outline and a slide for each of the one or more items of the outline; and update the content document with the selections.

19. The system of claim 11, wherein the instructions comprise further instructions that, upon execution by the one or more processors, cause the one or more processors to:

detect bias potential based on the response content;

generate hints to avoid the bias potential based on the response content; and display the hints.

20. The system of claim 11, wherein the instructions comprise further instructions that, upon execution by the one or more processors, cause the one or more processors to:

receive an indication that each of the one or more selectable content suggestions is rejected by a user;

generate hints based on the user query to help the user design a new user query; and display the hints.

* * * * *